United States Patent
Ramesh

(10) Patent No.: US 6,764,756 B1
(45) Date of Patent: Jul. 20, 2004

(54) POLYOLEFIN FOAM COMPOSITE STRUCTURE AND METHOD FOR MAKING THE SAME

(75) Inventor: Natarajan S. Ramesh, Danbury, CT (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 0 days.

(21) Appl. No.: 09/472,088

(22) Filed: Dec. 23, 1999

(51) Int. Cl.[7] .......................... B32B 27/00; B32B 7/12
(52) U.S. Cl. .................. 428/319.3; 428/319.7; 428/319.9; 428/314.8; 428/304.4; 428/316.6; 428/317.1; 428/317.7
(58) Field of Search .................. 428/304.4, 319.3, 428/319.7, 319.9, 314.8, 316.6, 315.9, 317.1, 317.7

(56) References Cited

U.S. PATENT DOCUMENTS

| | | | |
|---|---|---|---|
| 4,046,945 A | * 9/1977 | Baxmann et al. | 422/326 |
| 4,368,604 A | 1/1983 | Spielau et al. | 52/309.8 |
| 4,661,401 A | 4/1987 | Akao | 428/215 |
| 5,149,579 A | * 9/1992 | Park et al. | 428/213 |
| 5,180,628 A | 1/1993 | Haardt et al. | 428/215 |
| 5,242,750 A | 9/1993 | Wagner et al. | 428/316.6 |
| 5,275,860 A | * 1/1994 | D'Luzansky et al. | 428/71 |
| 5,473,015 A | 12/1995 | DeNicola, Jr. et al. | 525/71 |
| 5,516,582 A | 5/1996 | Hikasa et al. | 428/319.9 |
| 5,670,552 A | * 9/1997 | Gusavage et al. | 521/91 |
| 5,691,047 A | 11/1997 | Kurauchi et al. | 428/315.7 |
| 5,882,776 A | 3/1999 | Bambara et al. | 428/215 |
| 5,902,674 A | 5/1999 | Makino et al. | 428/318.6 |
| 5,928,776 A | 7/1999 | Shioya et al. | 428/316.6 |
| 5,938,878 A | 8/1999 | Hurley et al. | 156/219 |

* cited by examiner

Primary Examiner—Terrel Morris
Assistant Examiner—Hai Vo
(74) Attorney, Agent, or Firm—Thomas C. Lagaly

(57) ABSTRACT

A composite structure, which generally includes:
- a. a foam sheet comprising polyolefin; and
- b. a coating disposed on at least one surface of the polyolefin foam sheet, the coating comprising at least one member selected from the group consisting of ethylene/propylene rubber, homogeneous ethylene/alpha-olefin copolymer, and ethylene/acrylic acid copolymer.

8 Claims, 2 Drawing Sheets

US 6,764,756 B1

POLYOLEFIN FOAM COMPOSITE STRUCTURE AND METHOD FOR MAKING THE SAME

BACKGROUND OF THE INVENTION

The present invention relates generally to polyolefin foams and, more particularly, to extruded polyethylene foam sheets having a coating disposed thereon for bonding the polyethylene foam sheet to a polypropylene foam sheet.

Polyolefin foams, particularly polyethylene foams, and methods for manufacturing such foams are well known in the art. See, e.g., U.S. Pat. Nos. 5,348,984 (Lee), 5,462,974 (Lee), and 5,667,728 (Lee), the disclosures of which are incorporated herein by reference thereto. One of the most common polyethylenes used is low density polyethylene (LDPE).

While polyethylene (PE) possesses a number of beneficial physical and chemical properties when used to produce a foamed sheet, a disadvantage of PE is that extruded foam sheets made therefrom have a flexural modulus that is lower than would otherwise be desired for certain applications. For example, PE foams are commonly used to manufacture a type of flotation article known as a "bodyboard," which is a generally planar foamed structure of various shapes and sizes that allows individuals to be carried forward by oceanic waves as the waves break near the shore, i.e., to ride or "surf" the waves. This is commonly accomplished by grasping the edges of the bodyboard with a portion of the upper body positioned above, and often in contact with, the upper surface of the board. Individuals engaging in such activity generally prefer that the bodyboard be as stiff as possible as this allows the individual to maneuver the board to control somewhat the individual's direction of travel relative to the wave surface upon which the individual is "surfing." Too much flexure in the waveboard detracts from this ability to maneuver the board along the wave surface. Accordingly, efforts have been made to increase the stiffness of the foam used to make bodyboards.

One possible solution would be to construct the bodyboard from polypropylene (PP) foam, which is much stiffer than PE foam. However, PP foam has generally been found to be overly stiff and brittle, resulting in a bodyboard that is too easily damaged (e.g., gouged) and difficult to firmly grasp and handle, particularly when wet. In addition, PP foam has a surface texture that is uncomfortable against the skin, especially when rubbed against the skin as generally occurs during bodyboarding.

Another possibility would be to form a composite structure that includes a PE foam sheet bonded to a PP foam sheet. The PE foam sheet would provide comfort, grippability, and durability, while the PP foam sheet would provide increased stiffness and performance. Unfortunately, PP and PE foams are not chemically compatible and will not readily adhere to one another. Delamination is therefore a significant problem for PE foam/PP foam laminates.

It may be possible, in certain cases, to use special chemical adhesives (i.e., glues) to bond PP and PE foams. However, such adhesives are expensive and the process of coating and bonding is tedious and not cost-effective. The process involves slow production steps and the adhesives contain volatile organic solvents that are not environmentally friendly for commercial production. Extra equipment is generally needed to recover the solvents, thus further adding to the expense and complexity of the adhesive coating process.

Accordingly, a need exists in the art for an economical and practical means for bonding PP foam to PE foam with sufficient strength that the resultant composite structure is suitable for commercial use, such as for bodyboards or other watersport applications.

SUMMARY OF THE INVENTION

That need is met by the present invention, which provides a composite structure, comprising:
 a. foam sheet comprising polyolefin; and
 b. a coating disposed on at least one surface of the polyolefin foam sheet, the coating comprising at least one member selected from the group consisting of ethylene/propylene rubber, homogeneous ethylene/alpha-olefin copolymer, and ethylene/acrylic acid copolymer.

Advantageously, the coating is capable of bonding the polyolefin foam sheet to a second foam sheet having a different chemical composition than the polyolefin foam sheet at a bond strength of at least about 4 $lb_f$/inch.

In a preferred alternative embodiment of the invention, a multilayer composite structure comprises:
 a. a first foam layer comprising polyethylene homopolymer or copolymer;
 b. a second foam layer comprising polypropylene homopolymer or copolymer; and
 c. a coating disposed between and bonding the first and second foam layers together at a bond strength of at least about 4 $lb_f$/inch, the coating comprising at least one member selected from the group consisting of ethylene/propylene rubber, homogeneous ethylene/alpha-olefin copolymer, and ethylene/acrylic acid copolymer.

In accordance with yet another embodiment of the invention, a method for making a composite structure is provided, comprising:
 a. providing a foam sheet comprising polyolefin; and
 b. coating at least one surface of the polyolefin foam sheet, the coating comprising at least one member selected from the group consisting of ethylene/propylene rubber, homogeneous ethylene/alpha-olefin copolymer, and ethylene/acrylic acid copolymer,
 whereby, the coating is capable of bonding the polyolefin foam sheet to a second foam sheet having a different chemical composition than the polyolefin foam sheet at a bond strength of at least about 4 $lb_f$/ inch.

As is explained in further detail below, the invention provides a means for bonding PE foam to PP foam with a solventless coating process, i.e., via a coating that contains substantially no volatile organic solvent. Further, the resultant bond strength between the PE and PP foam sheets of at least 4 $lb_f$/inch is sufficiently high for commercial watersport applications.

DETAILED DESCRIPTION OF THE INVENTION

Figure 1:
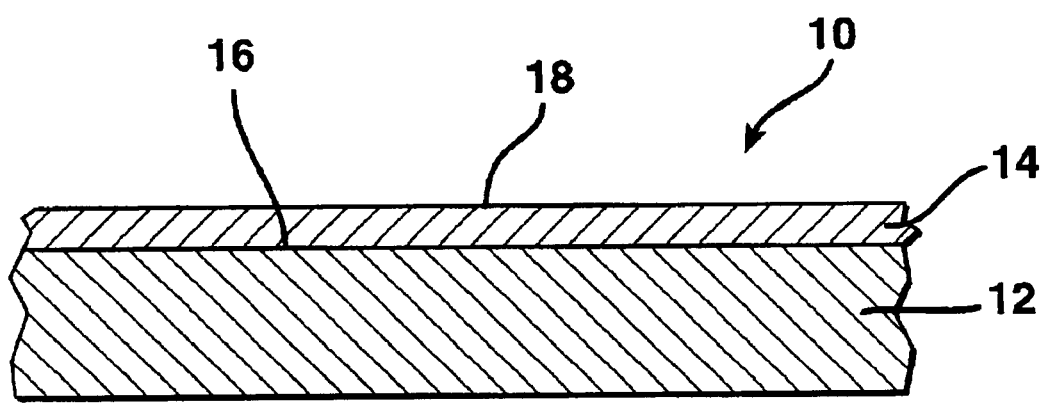
FIG. 1 is an elevational, cross-sectional view of a composite structure in accordance with the present invention.

FIG. 1 illustrates a composite structure 10 in accordance with the present invention, including a foam sheet 12 and a coating 14 in adherence with the foam sheet and disposed on surface 16 thereof.

The foam sheet 12 in accordance with the invention comprises a polyolefin, such as polyethylene homopolymer or copolymer or polypropylene homopolymer or copolymer. Examples of useful polyethylene homopolymers include low density polyethylene and high density polyethylene. Polyethylene copolymers may include, e.g., homogeneous ethylene/alpha-olefin copolymers (i.e., metallocene/single-site catalyzed copolymers of ethylene and, e.g., one or more $C_3$ to $C_{10}$ alpha-olefin comonomers) or heterogeneous (i.e., Ziegler-Natta catalyzed) ethylene/alpha-olefin copolymers. A preferred polyethylene is low density polyethylene (LDPE) having a melt flow index ranging from about 1 to about 40 and a density ranging from about 0.915 to about 0.930 g/cc.

Various polypropylenes are suitable in accordance with the practice of the present invention, including atactic, isotactic, syndiotactic, long-chain branced, and propylene/ethylene copolymers. Preferred polypropylenes have a melt flow index ranging from about 1 to 20 and a density ranging from about 0.87 to 0.915 g/cc. Further, a high melt strength/long-chain branched polypropylene is preferred. Such polypropylenes exhibit higher extensional viscosity when compared to other polypropylenes, resulting in beneficial strain hardening when the cells are expanded during the foaming process.

The foam sheet may have any desired thickness to suit the particular intended application, preferably ranging, e.g., from about 1/16 inch to about 5 inches. The foam may have any desired density, ranging, e.g., from about 1 to about 30 pounds/ft$^3$. The density preferably ranges from about 1.5 to about 10 pounds/ft$^3$ and, most preferably, from about 2 to about 8 pounds/ft$^3$. The foam sheet preferably has at least about 70% closed cells, more preferably about 80% closed cells and, most preferably, at least about 90% closed cells.

In a preferred embodiment, the polyolefin foam sheet 12 comprises polyethylene homopolymer or copolymer having a density ranging from about 0.4 to about 15 pounds/ft$^3$, more preferably from about 1 to about 10 pounds/ft$^3$, and most preferably from about 2 to about 8 pounds/ft$^3$.

In an alternative preferred embodiment, the polyolefin foam sheet 12 comprises polypropylene homopolymer or copolymer having a density ranging from about 0.5 to about 30 pounds/ft$^3$, more preferably from about 1 to about 10 pounds/ft$^3$, and most preferably from about 1 to about 6 pounds/ft$^3$.

Any conventional chemical or physical blowing agents may be used. Preferably, the blowing agent is a physical blowing agent such as carbon dioxide, ethane, propane, n-butane, isobutane, pentane, hexane, butadiene, acetone, methylene chloride, any of the chlorofluorocarbons, hydrochlorofluorocarbons, or hydrofluorocarbons, as well as mixtures of the foregoing.

The blowing agent may be mixed with the polyolefin in any desired amount to achieve a desired degree of expansion in the resultant foam. Generally, the blowing agent may be added to the polyolefin in an amount ranging from about 0.5 to 80 parts by weight, based on 100 parts by weight of the polyolefin. More preferably, the blowing agent is present at an amount ranging from 1 to 30 and, most preferably, from 3 to 15 parts per 100 parts by weight of the polyolefin.

If desired or necessary, various additives may also be included with the polyolefin. For example, it may be desirable to include a nucleating agent (e.g., zinc oxide, zirconium oxide, silica, talc, etc.) and/or an aging modifier (e.g., a fatty acid ester, a fatty acid amide, a hydroxyl amide, etc.). Other additives that may be included if desired are pigments, colorants, fillers, antioxidants, flame retardants, stabilizers, fragrances, odor masking agents, and the like.

Foam in accordance with the present invention is preferably made by an extrusion process that is well known in the art. In such a process, the polyolefin is added to an extruder, preferably in the form of resin pellets. Any conventional type of extruder may be used, e.g., single screw, double screw, and/or tandem extruders. In the extruder, the resin pellets are melted and mixed. A blowing agent is preferably added to the melted polyolefin via one or more injection ports in the extruder. Any additives that are used may be added to the melted polyolefin in the extruder and/or may be added with the resin pellets. The extruder pushes the entire melt mixture (melted polyolefin, blowing agent, and any additives) through a die at the end of the extruder and into a region of reduced temperature and pressure (relative to the temperature and pressure within the extruder). Typically, the region of reduced temperature and pressure is the ambient atmosphere. The sudden reduction in pressure causes the blowing agent to nucleate and expand into a plurality of cells that solidify upon cooling of the polymer mass (due to the reduction in temperature), thereby trapping the blowing agent within the cells.

Referring again to FIG. 1, coating 14 preferably has a thickness ranging from about 0.5 to about 20 mils (1 mil=0.001 inch); more preferably from about 1 to about 8 mils; and most preferably between about 1 and 6 mils. Coating 14 comprises at least one member selected from the group consisting of ethylene/propylene rubber (EPR), homogeneous ethylene/alpha-olefin copolymer, and ethylene/acrylic acid copolymer.

Suitable ethylene/propylene rubbers include both ethylene/propylene copolymer rubber and ethylene/propylene/diene terpolymer rubber. Ethylene/propylene copolymer rubber may have an ethylene content of from about 30 to about 80 wt. % (with the balance comprising propylene) while ethylene/propylene/diene terpolymer rubber may have an ethylene content of about 30 to about 70 wt. % and a diene content of from about 1 to about 10 wt. % (again, with the balance comprising propylene). More preferably, the ethylene content ranges from about 50 to about 75 wt. %. The typically used diene monomers are generally selected from the easily polymerizable non-conjugated dienes and can be straight chain, hydrocarbon diolefins or cycloalkenyl-substituted alkenes, having about 6 to about 15 carbon atoms. For example, 1,4-hexadiene may be used to make ethylene/propylene/ 1,4 hexadiene terpolymer. Other examples of useful diene monomers are dicyclopentadiene and 2-methylene-5-norbornene compounds. The degree of unsaturation is usually in the range of 2 to 15 double bonds per 1000 carbon atoms, distributed randomly on the polymer chain. Typically, ethylene-propylene rubbers are made from monomers that have a specific gravity in the neighborhood of 0.87.

If desired, e.g., for reasons of economy, the ethylene/propylene rubber may be blended with another material, such as a polyethylene homopolymer or copolymer, a polypropylene homopolymer or copolymer, or blends thereof.

Coating 14 may also comprise homogeneous ethylene/alpha-olefin copolymer. As is well understood in the art, a "homogeneous" ethylene/alpha-olefin copolymer refers to ethylene/alpha-olefin copolymerization reaction products of relatively narrow molecular weight distribution and relatively narrow composition distribution. Homogeneous ethylene/alpha-olefin copolymers are structurally different from heterogeneous ethylene/alpha-olefin copolymers, in that homogeneous ethylene/alpha-olefins exhibit a relatively even sequencing of comonomers within a chain, a mirroring of sequence distribution in all chains, and a similarity of length of all chains, i.e., a narrower molecular weight distribution. Furthermore, homogeneous ethylene/alpha-olefin copolymers are typically prepared using metallocene, or other single-site type catalysts, rather than using Ziegler Natta catalysts. Such single-site catalysts typically have only one type of catalytic site, which is believed to be the basis for the homogeniety of the polymers resulting from the polymerization. A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of 1-butene, 1-pentene, 1-hexene, and 1-octene.

Homogeneous, as opposed to heterogeneous, ethylene/alpha-olefin copolymers have been found to provide excellent adhesion between, e.g., a polyethylene foam sheet and a polypropylene foam sheet, and therefore are beneficially employed in a coating in accordance with the present invention. Preferred homogeneous ethylene/alpha-olefins have a density of less than about 0.94 g/cc, more preferably less than 0.92 g/cc, and most preferably less than about 0.91 g/cc.

Ethylene/acrylic acid copolymer (EAA) has also been found to provide good adhesion between PE and PP foam sheets. Such materials are generally less preferred, however, due to their relatively high cost in comparison with EPR and homogeneous ethylene/alpha-olefin copolymer.

Advantageously, coating 14 may be substantially solventless, i.e., containing substantially no volatile organic carrier fluids to either evaporate into the environment or be recovered by expensive pollution control equipment. This is because the coating in accordance with the invention is not a solvent-based adhesive but is, in a preferred embodiment, a thermoplastic polymer composition that can be melted and coated onto a surface of the foam sheet by, e.g., extrusion-coating or coextruding the coating onto the foam as described in more detail below. Instead of relying on evaporation of a solvent in order for the coating to cure, a thermoplastic coating in accordance with the present invention simply cools and solidifies, with little or no evaporation of volatile organic solvents.

At the same time, coating 14 has been found capable of bonding foam sheet 12 to a second foam sheet having a different chemical composition, i.e., different from that of foam sheet 12, at a bond strength of at least about 4 $lb_f$/inch. This has been determined to be the minimum acceptable bond strength for commercial applications, e.g., for bodyboard or other watersport use. As demonstrated in the examples, EPR, homogeneous ethylene/alpha-olefin copolymer, and EAA have been shown to be capable of bonding PE foam to PP foam at a bond strength greater than 4 $lb_f$/inch. A more preferred bond strength is at least about 4.5 $lb_f$/inch.

When a second foam sheet, comprising a material of a different chemical composition than polyolefin foam sheet 12, is bonded via coating 14 to foam sheet 12, a number of combinations of different foam/foam laminates are possible. In one such combination, polyolefin foam sheet 12 having coating 14 thereon may comprise polyethylene homopolymer or copolymer while a second foam sheet bonded to surface 18 of coating 14 comprises polypropylene homopolymer or copolymer. The inverse is also possible, i.e., where the coated polyolefin foam sheet 12 comprises polypropylene homopolymer or copolymer and the second foam sheet bonded to surface 18 of coating 14 comprises polyethylene homopolymer or copolymer.

Figure 2:
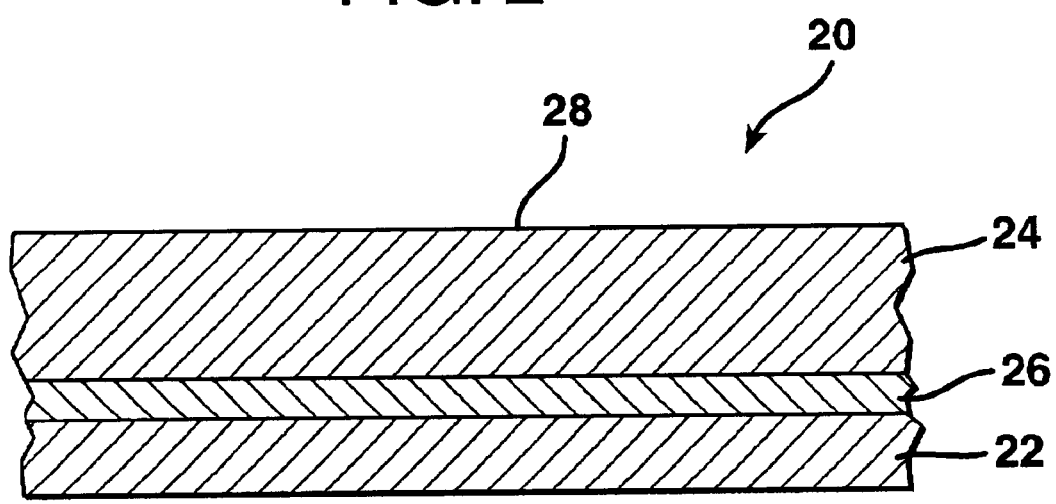
FIG. 2 is an elevational, cross-sectional view of an alternative composite structure in accordance with the present invention.

A preferred multilayer composite structure 20 for use as a bodyboard is illustrated in FIG. 2. The composite structure includes a first foam layer 22 comprising polyethylene homopolymer or copolymer, a second foam layer 24 comprising polypropylene homopolymer or copolymer, and a coating 26 disposed between and bonding the first and second foam layers together at a bond strength of at least about 4 $lb_f$/inch. The composition of coating 26 is as described above with respect to coating 14. For bodyboard applications, first foam layer 22 preferably comprises low density polyethylene having a density ranging from about 0.4 to about 15 pounds/ft$^3$ and a thickness ranging from about 1/16 to about 1 inch, while second foam layer 24 preferably comprises polypropylene homopolymer having a density ranging from about 0.5 to about 10 pounds/ft$^3$ and a thickness ranging from about 1 to about 4 inches. Coating 26 is preferably as thin as possible, ranging from about 1 to about 5 mils.

The composite structure 20 is highly advantageous when used to form a bodyboard, with the PE foam sheet 22 providing comfort, grippability, and durability and the PP foam sheet 24 providing stiffness for good maneuverability while surfing. In addition, the coating 26 in accordance with the present invention provides a strong bond between the PE and PP foam sheets. If desired, an additional PE foam sheet, similar or identical to first foam layer 22, can be bonded to surface 28 of PP foam sheet 24 via a second coating layer 26 disposed between the additional PE foam sheet and surface 28 of PP foam sheet 24. In this configuration, relatively thin PE foam sheets form "skin" layers around a relatively thick "core" PP foam layer. This is a particularly advantageous configuration for bodyboard use as the outermost principle surfaces of the composite have the comfort and grippability of PE foam with a rigid PP foam core for enhanced wave riding performance.

Having now described composite structures in accordance with the invention, a preferred method for making composite structure 10 (FIG. 1) will be discussed with reference to FIG. 3. Foam sheet 12 is unwound from a storage roll 30 and sent to nip roller 32. Simultaneously, coating 14 is extruded onto surface 16 of foam sheet 12 between nip roller 32 and chill roller 34. This is a result of placing resin pellets of the polymer(s) used to make coating 14 into hopper 36, from which they enter extruder 38 wherein the pellets are mixed and melted. The resulting molten polymer is extruded into and through die 40 and onto surface 16 of foam sheet 12 as shown. Chill roller 34 is maintained at a sufficiently low temperature, e.g., less than about 65° F., to cause the extruded polymer blend to solidify into coating 14 in adherence with foam sheet 12. In addition, nip roller 32 and chill roller 34 are urged against one another, e.g., by mechanical or pneumatic means, with sufficient pressure to facilitate the bonding of the coating to the foam by squeezing the film and foam together as they pass between the two rollers. A third roller 42 may also be included to keep the resultant composite structure 10 in contact with chill roller 34 for a full half revolution about the chill roller, and to again apply pressure to the film/foam composite to facilitate bonding of the two materials. The finished composite structure 10 is then wound on storage roll 44.

The foregoing process is known as an extrusion coating process because the film is extruded in a molten state onto a previously formed and solidified foam sheet, whereon the film congeals and solidifies. Such a process is well known and further described, e.g., in U.S. Pat. No. 3,616,020. It is to be understood, however, that a method in accordance with the present invention is not limited to the illustrated extrusion coating process. Many alternatives are possible. For instance, instead of the 'off-line' extrusion coating process illustrated in FIG. 3, wherein a previously made foam sheet is taken from a storage roll, an 'in-line' process may be employed wherein the foam sheet can be extruded from a die and allowed to travel a sufficient distance to solidify before being coated, without the intermediate steps of winding and unwinding the foam on and from a storage roll. As a further alternative, a coextrusion process may be used in which the coating and foam are simultaneously extruded from separate dies and brought into contact with one another while both are still in a molten state.

Figure 3:
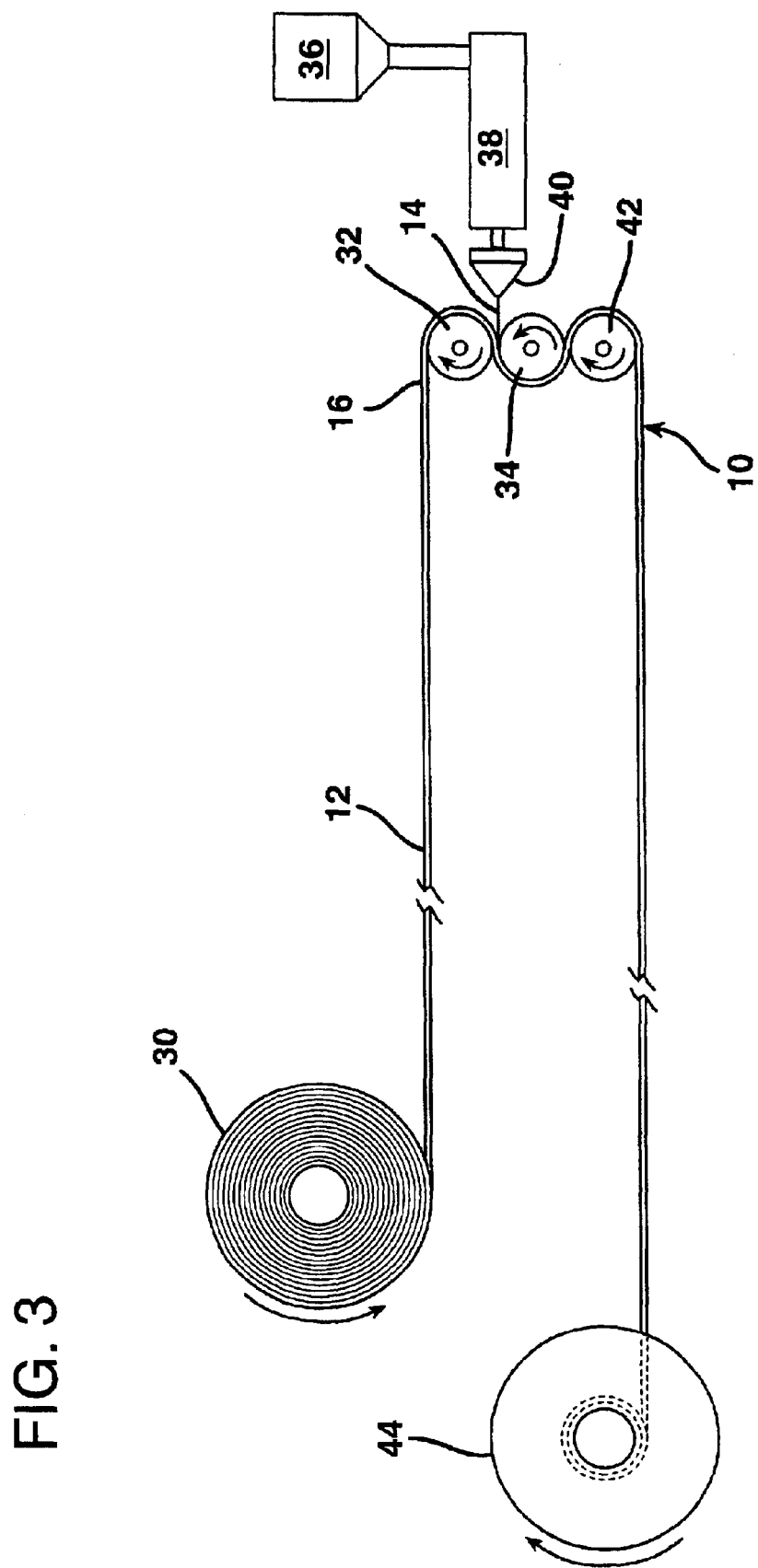
FIG. 3 is a schematic view of a preferred process for making the composite structure shown in FIG. 1.

In order to make the composite structure 20 as shown in FIG. 2, either the PE foam sheet 22 or PP foam sheet 24 may be coated with coating 26, e.g., by extrusion coating as shown in FIG. 3. Thereafter, the other foam sheet is laminated to the coated surface, i.e., to coating 26, preferably by applying heat to one or both surfaces to be bonded, and then pressing the coated foam and non-coated foam together, e.g., between a pair of nip rollers. Alternatively, the entire three-layer structure can be coextruded.

These and other aspects and advantages of the invention may be further understood by reference to the following examples, which are provided for illustrative purposes only and are not intended in any way to be limiting.

EXAMPLES

LDPE foam sheet having a density of 8 pounds/ft$^3$ (pcf, and a thickness of 3/16 inch was made using a standard extrusion process as described above. The sheet was wound in the form of a roll. The roll was mounted on an extrusion coating apparatus for applying a coating in accordance with the present invention on one surface of the foam sheet.

In the extrusion coating apparatus, resins used for the various coating formulations of Examples 1–6, as summarized in Table 2 below, were melted in a single screw extruder, sent through a cast die, and coated onto one surface of the LDPE foam sheet. The coated foam sheet then traveled between a pair of nip rollers. The resultant coating had a thickness of approximately 5 mils (0.005 inch).

The resins used for each of the coatings in Examples 1–6 (the control sample had no coating) are summarized in Table 1.

TABLE 1

| Resin Type Indicated in Table 2 | Description |
|---|---|
| EPR | ADFLEX KS359P ethylene/propylene rubber having between 50 and 75 wt. % ethylene and dispersed in polypropylene; commercially available from Montell North America, Inc., Wilmington, Delaware. |

TABLE 1-continued

| Resin Type Indicated in Table 2 | Description |
|---|---|
| LDPE | DOW LDPE 4012 low density polyethylene, commercially available from Dow Chemical, Midland, MI, having a density of 0.916 g/cc and a MI of 12. |
| MC-EAO1 | ATTANE 4404 metallocene-catalyzed (homogeneous) ethylene/alpha-olefin (octene) copolymer having a density of 0.904 g/cc and a MI of 4.0; commercially available from Dow Chemical. |
| EAA | PRIMACORE 3440 ethylene/acrylic acid copolymer having a density of 0.938 g/cc and a MI of 10.5; commercially available from Dow Chemical. |
| MC-EAO2 | AFFINITY PT1450 metallocene-catalyzed (homogeneous) ethylene/alpha-olefin (octene) copolymer having a density of 0.902 g/cc and a MI of 7.5; commercially available from Dow Chemical. |

The following summarizes the extrusion coating conditions:

Screw speed: 33–34 rpm

Total output rate: 88–91 Kg/hr

Melt temperature (measured at the die): 370–373° F.

Die pressure: 1200–2000 psi

Nip roll temperature: 65 ° F.

Samples of the coated and uncoated ("control") foam sheets were bonded to the surface of a 1.5 pcf density polypropylene plank having a thickness of about 2.25 inches using a hot air lamination process in which both surfaces to be bonded together were contacted with air maintained at 400° F., and then the two foams were pressed together by squeezing them between a pair of nip rollers such that the two heated surfaces were urged together to form a bond. In the case of the coated samples (Examples 1–6 in Table 2), the coated surface of the LDPE foam sheet was heated and brought into contact with the heated surface of the PP foam.

The bond strength between the LDPE and PP foams of the resultant composite structures was then tested using an INSTRON measurement device in accordance with ASTM F904–98 as follows:

1. Test samples of each foam sheet were prepared, each sample being 1inch wide and 3 inches in length;
2. Initiated separation of the foam sheets at the foam/foam interface of each test sample at one end thereof;
3. Clamped each separated end of the test specimen in one of the two jaws of the INSTRON device using a starting jaw distance of 25.4 mm (1.0 inch); and
4. Activated the INSTRON device by causing the jaws to separate from one another at a speed of 4 inches/minute (this was slower than 10 inches/minute as specified in the ASTM procedure, due to the fact that the bond strength of a foam/foam laminate was tested, as opposed to a film/film laminate, for which a higher separation speed is more appropriate). The maximum force required to separate each test specimen was measured and recorded. This value is reported as the "Bond Strength" in Table 2 (i.e., maximum separation force/inch width of the tested specimen).

TABLE 2

| | Control | Example 1 | Example 2 | Example 3 | Example 4 | Example 5 | Example 6 (Compar.) |
|---|---|---|---|---|---|---|---|
| Coating | None | Ethylene-Propylene Rubber (EPR) | EPR/LDPE blend at 70%/30% by weight | MC-EAO1 | Ethylene/Acrylic Acid Copolymer (EAA) | MC-EAO2 | MC-EAO2/LDPE blend at 70%/30% by weight |
| Bond Strength, lb/inch | 1.51 | 6.3 | 4.74 | 5.46 | 5.03 | 5.04 | 3.47 |
| % Increase in Adhesion Strength* | — | 317% | 214% | 262% | 233% | 233% | 130% |
| Comments | PE foam peels easily from PP foam. | Excellent adhesion between PE and PP surfaces. | Excellent adhesion between PE and PP surfaces. | Excellent adhesion between PE and PP surfaces. | Excellent adhesion between PE and PP surfaces. | Excellent adhesion between PE and PP surfaces. | Moderate adhesion between PE and PP surfaces. |

*((Force required for coated sample-Force required for uncoated sample)/(Force required for uncoated sample)) × 100

As indicated by the results in Table 2, all coatings in Examples 1–6 provided an increase in adhesion between the LDPE and PP foam sheets vs. the Control structure, which had no coating disposed between the foam sheets. The composite structures of Examples 1–5 demonstrated a sufficiently high bond strength for commercial use. In fact, the bond strength between the foam sheets of Examples 1–5 was so strong that, instead of delamination between the foam sheets, most of the separation occurred within the LDPE foam sheet as cohesive failure. The bond strength of the Example 6 composite structure was observed to be insufficient for commercial applications. The minimum bond strength for commercial applicability thus appears to be about 4 $lb_f$/inch.

While the invention has been described with reference to illustrative examples, those skilled in the art will understand that various modifications may be made to the invention as described without departing from the scope of the claims which follow.

What is claimed is:

1. A multilayer composite structure, comprising:
   a. a first foam layer comprising polyethylene homopolymer or copolymer:
   b. a second foam layer comprising polypropylene homopolymer or copolymer, and
   c. a coating disposed between and bonding said first and second foam layers together at a bond strength of at least about 4 $lb_f$/inch, said coating having a thickness ranging from about 1 to about 6 mils and comprising at least one member selected from the group consisting of ethylene/propylene rubber, homogeneous ethylene/alpha-olefin copolymer, and ethylene/acrylic acid copolymer, wherein said polyethylene foam layer has a thickness ranging from about 1/16 to about 1 inch and said polypropylene foam has a thickness ranging from about 1 to about 4 inches, and said composite structure is in the form of a flotation article.

2. The composite structure of claim 1, wherein said coating comprises ethylene/propylene rubber.

3. The composite structure of claim 1, wherein said coating is substantially solventless.

4. The composite structure of claim 1, wherein said first foam layer comprises low density polyethylene.

5. The composite structure of claim 1, wherein said first foam layer has a density ranging from about 0.4 to about 15 pounds/ft$^3$.

6. The composite structure of claim 1, wherein said second foam layer comprises polypropylene homopolymer.

7. The composite structure of claim 1, wherein said second foam layer has a density ranging from about 0.5 to about 10 pounds/ft$^3$.

8. The composite structure of claim 1, wherein the bond strength between said first and second foam layers is at least about 4.5 $lb_f$/inch.

* * * * *